(12) United States Patent
Kirkman et al.

(10) Patent No.: US 7,633,198 B2
(45) Date of Patent: Dec. 15, 2009

(54) 50 DN ALTERNATOR STATOR TERMINAL INSULATOR APPARATUS

(76) Inventors: Robert Ernest Kirkman, 20458 Woodbend Dr., Northville, MI (US) 48167; Robert Ryan Kirkman, 6355 Wing Lake Rd., Bloomfield, MI (US) 48301

( * ) Notice: Subject to any disclaimer, the term of this patent is extended or adjusted under 35 U.S.C. 154(b) by 459 days.

(21) Appl. No.: 11/374,894

(22) Filed: Mar. 14, 2006

(65) Prior Publication Data
US 2006/0208584 A1 Sep. 21, 2006

Related U.S. Application Data

(60) Provisional application No. 60/662,338, filed on Mar. 16, 2005.

(51) Int. Cl.
*H02K 7/10* (2006.01)
(52) U.S. Cl. .......................................................... 310/71
(58) Field of Classification Search ............... 310/68 D, 310/71
See application file for complete search history.

(56) References Cited

U.S. PATENT DOCUMENTS

| | | | |
|---|---|---|---|
| 3,780,323 A | 12/1973 | Swain | |
| 4,318,022 A | 3/1982 | Miller | |
| 4,340,829 A | 7/1982 | McCoy | |
| 4,893,041 A | 1/1990 | Snider et al. | |
| 4,904,893 A | 2/1990 | Snider et al. | |
| 5,043,614 A | 8/1991 | Yockey | |
| 5,175,458 A | 12/1992 | Lemmer et al. | |
| 5,640,062 A | 6/1997 | Yockey | |
| 5,752,852 A * | 5/1998 | Onoda | 439/559 |
| 6,184,602 B1 * | 2/2001 | Ooiwa et al. | 310/68 D |
| 6,462,459 B1 * | 10/2002 | Kirkman | 310/273 |
| 6,657,336 B2 * | 12/2003 | Morikaku et al. | 310/68 D |
| 6,825,586 B2 | 11/2004 | Edrington | |

OTHER PUBLICATIONS

Delco Remy, Division of General Motors Corporation, Anderson, Indiana, Service Bulletin 1G-258, 6 pages, Date: Sep. 1, 1986, Tests of Delcotron Generators (50-DN Series, 500 Type).

* cited by examiner

*Primary Examiner*—Dang D Le
(74) *Attorney, Agent, or Firm*—John A. Miller; Miller IP Group, PLC

(57) ABSTRACT

An oil-cooled 50DN stator terminal insulator comprising an insulating base member with an insulating bushing extending from a top surface of the base member for insulating one of multiple stator lead terminals, and associated parts kit. The insulator includes a central aperture for receiving the terminal such that the insulator and the terminal are independently movable with respect to the remaining terminals of the stator in order to facilitate assembly of the stator and a rectifier housing having a plurality of openings extending from an internal surface to an external surface. The ability of the terminal with the insulator to move independent of the remaining terminals provides the stator with resistance to vibrations.

26 Claims, 10 Drawing Sheets

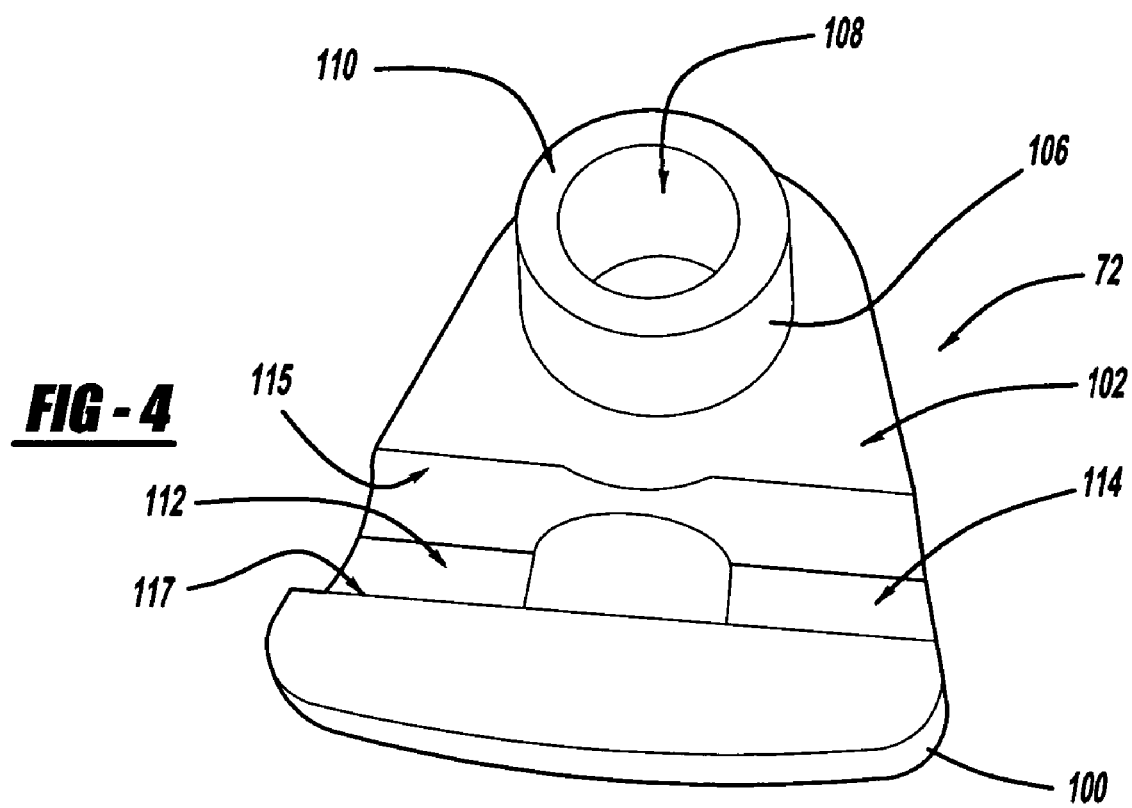
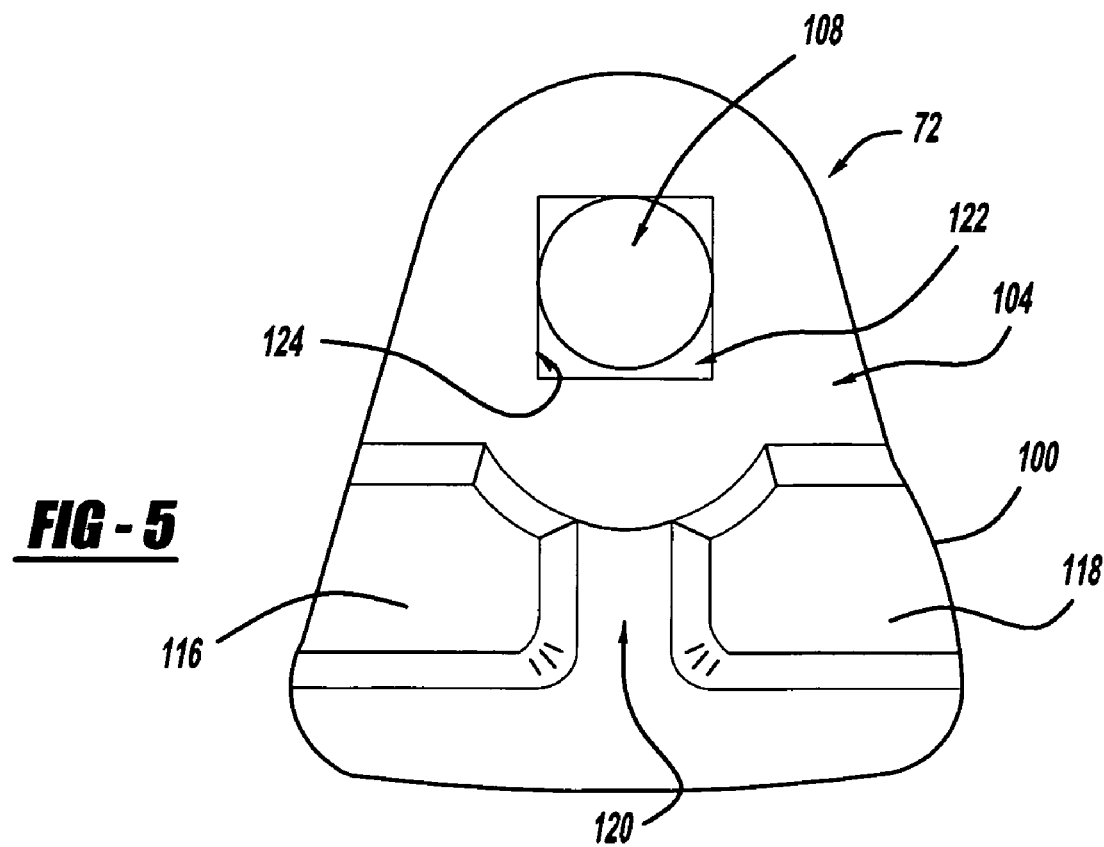

US 7,633,198 B2

50 DN ALTERNATOR STATOR TERMINAL INSULATOR APPARATUS

CROSS REFERENCE TO RELATED APPLICATIONS

This application claims the benefit of the filing date of U.S. Provisional Application No. 60/662,338, titled 50 DN Alternator Stator Terminal Insulator Apparatus, filed Mar. 16, 2005.

BACKGROUND OF THE INVENTION

1. Technical Field

This invention relates to the field of heavy duty alternators and, more particularly, to an improved stator terminal insulator and parts kit for use in the manufacturing and remanufacturing of oil-cooled 50 DN alternators that produce a direct current (DC) output for use in conjunction with bus or coach vehicle electrical systems.

2. Discussion of the Related Art

The use of a totally enclosed oil-cooled 50 DN alternator that includes a three-phase stator winding assembly with three phase leads and associated terminals is generally known in the art. More specifically, an oil-cooled 50 DN alternator is a brush-less alternator with a stationary field winding assembly, a stationary stator winding assembly, and a rotating rotor that is cooled by a continuous flow of oil supplied by an associated internal combustion engine. The stator windings are enclosed in an aluminum case and are electrically coupled to six diodes that form a rectifier. A rectifier end frame housing assembly contains the rectifier and is connected to a top end of the stator case from which the stator terminals extend. A bottom end of the stator case is connected to a drive end frame assembly that contains a ball bearing, a roller bearing, a collar, and oil seal assembly. The bearings, collar and oil seal assembly are press fit on the rotor such that the rotor rotates between the stator winding assembly and the field winding assembly creating electrical currents. The rectifier end frame assembly, the stator assembly, and the drive end frame assembly are assembled with insulators and o-rings forming an oil-proof assembly for the circulating cooling oil. By way of example, additional features and specifications of a typical belt driven oil-cooled 50 DN alternator (generator) that are well know to one skilled in the art are described in Delco Remy Service Bulletin 1G-258 dated Sep. 1, 1986.

Transit bus and coach vehicle applications commonly utilize oil-cooled 50 DN alternators to produce a direct current (DC) output to meet the electrical demands of these vehicles. Unfortunately, due to increasing electrical demands on transit buses and coaches, oil-cooled 50 DN alternators are subjected to increasing operating temperatures, electrical loads and engine vibration that shorten the life cycle of these alternators. A common fault mode is when a stator assembly fails due to a mechanical or insulation failure in the winding assembly resulting from the increasing demand that an alternator is subjected to. It is common practice that once an oil-cooled 50 DN alternator fails, the alternator is remanufactured to its original specifications. This is accomplished by disassembling all or a portion of the alternator's components and by replacing a defective stator assembly with a new or remanufactured stator assembly along with any other failed components.

FIG. 1 shows a prior art oil-cooled 50 DN alternator stator assembly 10 that includes a steel lamination 12 with silver soldered or welded copper hair-pins 14 that form a three phase stator winding assembly 16. The three phase winding assembly 16 includes three leads 18 each with an associated brass terminal 20 for carrying the electrical current from the hair-pins 14 to a rectifier (not shown). The steel lamination 12 and the hair-pins 14 are enclosed by an aluminum stator case 22. The lamination 12 is positioned within the stator case 22 by three locking bolts (not shown) that are installed through the case 22 and into the lamination 12. The three lead terminals 20 extend a predetermined distance above a top end of the stator case 22. As will be discussed below, the three terminals 20 are positioned such that they extend through three openings in a rectifier end frame housing during assembly of the stator assembly 10. Three planar insulators 24, Delco Remy part number 1941051, are installed over the terminals 20 about end sections 26, and the leads 18 are covered with insulated sleeving material 28 to prevent shorting with the stator case 22.

A commonly known prior art oil-cooled 50 DN alternator stator assembly includes three stator leads formed from rigid copper wire that is welded to the stator's lead terminals. This is commonly referred to a rigid lead design stator assembly. It is common to form the rigid leads as an extension of hair-pin coils that form the stator's winding assembly. Unfortunately, it is well know to one skilled in the art that the rigidity of such a stator lead design causes the stator assembly to be prone to failure wherein the leads and/or associated terminals break off from the wound hair-pin assembly. Such failures are due to the operational conditions of the alternator wherein the stator assembly is exposed to high temperatures and extreme vibrations.

As an improvement to the rigid lead design, the stator assembly 10 incorporates a flexible lead design wherein the leads 18 are formed from flexible stranded wire that is electrically connected to the hair-pins 14 and the terminals 20. As disclosed in U.S. Pat. No. 6,825,586 and in the Delco Remy publication titled "50 DN Alternator Product Improvements" dated Oct. 28, 2002, a problem associated with stator assemblies such as the stator assembly 10 of FIG. 1, referred to as the Current Design in the publication, is that the #8 AWG flexible leads 18 with the terminals 20 are difficult to assemble due to independent movements of the terminals 20.

FIG. 2 shows another prior art oil-cooled 50 DN alternator stator assembly 40. U.S. Pat. No. 6,825,586 and the above-referenced "50 DN Alternator Product Improvements" publication disclose and teach the use of a rigid one-piece stator and terminal lead insulator 60, shown in FIG. 2 as part of the stator assembly 40, as the original equipment manufacturer's (OEM) improvement to the problems associated with the Current Design stator assembly 10 of FIG. 1. The stator assembly 40 is referred to as the New Design in the above-referenced Delco Remy publication. The stator assembly 40 includes a steel lamination 42 with silver soldered or welded copper hair-pins 44 that form a three phase stator winding assembly 46. The three phase winding assembly 46 includes three #6 flexible bare cable leads 48 each with an associated terminal 50 for carrying the electrical current from the hair-pins 44 to a rectifier (not shown). Unlike the stator assembly 10, the leads 48 are not covered with any insulating material such that the outer surfaces of the leads 48 are exposed. The steel lamination 42 and the hair-pins 44 are enclosed by an aluminum stator case 52. The lamination 42 is positioned within the stator case 52 by locking bolts 54 that are installed through the case 52 and into the lamination 42. The three lead terminals 50 extend a predetermined distance above a top end of the stator case 52. The rigid one-piece stator lead and terminal insulator 60 receives and, as disclosed in the prior art, snugly holds all three of the terminals 50. Furthermore, the rigid one-piece insulator 60 is secured to the unsupported bare cable leads 48 with ties 62 such that, as disclosed in the prior art, the leads 48 are fixed to the insulator 60 along the circumference of the insulator 60. The exterior circumference of the insulator 60 is positioned just inside the interior circumference of the case 52. O-rings 64 are positioned on the terminals 50 above three cylindrical retainers 66 of the rigid one-piece insulator 60.

The rigid one-piece insulator 60 is an alleged improvement to the prior art Current Design because the cable leads 48 are fixed to the rigid one-piece insulator 60 with the ties 62 and because the rigid one-piece insulator 60 prevents the terminals 50 from moving independent of one another during and after assembly of the stator assembly 40 as part of an oil-cooled 50 DN alternator. As such, the prior art New Design teaches away from the use of independently moving flexible leads in favor of fixed leads similar in nature to the prior art rigid lead design. Additionally, the prior art discloses that the rigid one-piece insulator 60 provides a thicker insulator, retainer portions 66, as compared to original top hat insulators, Delco Remy part number 1952212, that will be described in connection with FIGS. 9-11. These top hat insulators are used in conjunction with the planar insulators 24 in FIG. 1 to insulate the terminals 20 of the Current Design by extending from within the interior of an original rectifier end frame housing into three openings leading to the stator assembly 10.

As disclosed in Delco Remy Instruction Sheet, Reference 10502989, dated Apr. 10, 2003, in order to assemble the rigid one-piece insulator 60 to a rectifier frame (housing), Delco Remy part number 10471611, the three terminal holes (openings) in the rectifier frame (housing) must be drilled out to an enlarged diameter in order to accept the retainer portions 66. As disclosed in the prior art, and the importance of which will become apparent to one skilled in the art, it is important to maintain the terminal holes (openings) center locations during drilling operations.

A problem with using the rigid one-piece insulator 60 is that the increased thickness of the retainer portions 66, when compared to the thickness of the original top hat insulators, requires that the terminal openings of an original rectifier housing must be drilled out and the enlarged openings must have centers aligned with the fixed positions of the terminals 50. As a result, another problem is that the rigid one-piece insulator 60 cannot be used in conjunction with an unmodified original rectifier housing, i.e. one that has not been drilled out. Another problem is that because the one-piece insulator 60 is rigid and the terminals 50 are snugly held in position within the retainers 66, if the terminals 50 are not properly aligned with a rectifier housing's drilled out openings or if the openings are not drilled properly with aligned centers, the terminals 50 can experience side-strain forces that can cause the rigid one-piece insulator 60 to crack leading to or causing grounding or shorting conditions within the stator assembly 40. Similarly, because the leads 48 are fixed against the rigid one-piece insulator 60 with the ties 62, the leads 48 have problems similar to the prior art rigid leads in that the leads 48 do not move independently of the terminals 50. This rigidity makes the leads 48 susceptible to breaking off from their connections to the hair-pins 44 when all of the terminals 50 and rigid one-piece insulator 60 are forced to move together as a single unit during the assembly process with a drilled out rectifier housing. Also, in contrast to the statements in the prior art, the bare leads 48 are susceptible to shorting out with the case 52 due to the leads 48 close proximity to the case 52 during such movements. Additionally, the rigid one-piece insulator 60 and the leads 48 are susceptible to such failures after assembly of the stator assembly 40 as part of a new or a remanufactured oil-cooled 50 DN alternator. Post-assembly failures occur due to terminal side-strain forces and/or exposure to high temperatures and vibrations that attempt independent movements of the snugly held terminals 50 and/or the fixed leads 48 with respect one another and/or a rectifier housing and/or the winding assembly 46.

Upon failure of a 50 DN alternator, it is generally known in the art to use a kit containing component piece parts that require replacement during the remanufacturing process of the 50 DN alternators. However, the prior art does not teach or suggest the ability of removing and replacing the rigid one-piece insulator 60 after failure. Rather, U.S. Pat. No. 6,825,586 discloses and teaches, by way of example, that the securing ties 62 are made from an epoxy impregnated fiberglass cord.

It is therefore desirable to provide an improved oil-cooled 50 DN alternator stator terminal lead insulator including an electrically insulating bushing that insulates one of multiple stator terminals from a rectifier housing and provides for independent movement of the terminal and insulator with respect to the remaining terminals of the stator in order to facilitate assembly of the stator and the rectifier housing.

More particularly, it is desirable to provide an oil-cooled 50 DN alternator parts kit having at least one removable insulator for use in electrically insulating a stator with multiple leads and terminals from a rectifier housing having multiple openings while providing for independent movement of one of the terminals with respect to the remaining terminals of the stator.

It is further desirable to provide a dual application oil-cooled 50 DN alternator parts kit including at least one insulator with an insulating bushing for insulating a stator with multiple leads and terminals from a rectifier housing having multiple openings each with an original first diameter or with multiple openings that have each been increased from the original first diameter to a second larger diameter.

SUMMARY OF THE INVENTION

In accordance with the teachings of the present invention, an improved insulator for use with a 50 DN stator having a plurality of leads and a plurality of terminals comprising an electrically insulating base member including a top surface and a bottom surface is disclosed. The insulator includes an electrically insulating bushing extending from the top surface of the base member and includes an aperture extending through the base member and the bushing for receiving one of the plurality of terminals. The insulator and the terminal are independently movable with respect to the remaining terminals of the stator in order to facilitate assembly of the stator and a rectifier housing having a plurality of openings extending from an internal surface to an external surface. The ability of the terminal with the insulator to move independent of the remaining terminals provides the stator with resistance to vibrations.

In accordance with the teachings of one embodiment of the present invention, a 50 DN parts kit includes the insulator for use during assembly of an oil-cooled 50 DN alternator stator assembly and a rectifier end frame housing assembly and wherein the insulator is readily removable and replaceable.

In accordance with one embodiment, the insulator is included in a dual application parts kit for insulating a 50 DN stator and a rectifier end frame housing having multiple original first diameter openings or a rectifier end frame housing having multiple enlarged openings that have been increased from the original first diameter to a second larger diameter via removal of the insulator from one of the plurality of stator terminals.

In accordance with another embodiment, a 50 DN alternator stator includes the stator terminal lead insulator with the insulating bushing insulating one of multiple stator terminals from a rectifier housing and provides for independent movement of the terminal with respect to the remaining terminals of the stator in order to facilitate assembly and/or remanufacturing of an oil-cooled 50 DN alternator. The improved stator terminal insulator is resistant to heat and vibrations such that the useful life of the 50 DN stator and resulting oil-cooled 50 DN alternator is increased with respect to the prior art 50 DN stators.

BRIEF DESCRIPTION OF THE DRAWINGS

The various advantages of the present invention will become apparent to those skilled in the art after reading the following specification and by reference to the drawings in which:

FIG. 4 is a top perspective view of the improved stator terminal insulator in accordance with the teachings of the present invention;

FIG. 5 is a bottom view the improved stator terminal insulator in accordance with the present invention;

DETAILED DESCRIPTION OF THE EMBODIMENTS

The following description of the embodiments of the invention is merely exemplary in nature and is in no way intended to limit the invention or its application or uses.

The present invention is particularly concerned with providing an improved stator terminal insulator that is installed on at least one terminal of an oil-cooled 50 DN alternator stator such that the insulator and terminal are independently movable with respect to the remaining terminals of the stator in order to facilitate assembly of the stator with a rectifier housing having a plurality of openings extending from an internal surface to an external surface. The insulator is removable from the terminal for discard or replacement such that the stator can be utilized with a rectifier housing including original first diameter openings or a rectifier housing including enlarged second diameter openings that have been drilled out in order to receive an insulating bushing of the insulator. The present invention is also concerned with providing a 50 DN parts kit including an improved stator terminal insulator used in conjunction with a terminal of an oil-cooled 50 DN alternator stator assembly. The present invention is applicable for both gear and belt driven 50 DN stators and alternators such as, but not limited to, Delco Remy part numbers 10502989, 10504154, 10510669, 10504153, 10510671, 10504155, 10510674, 10504156, 10459123, 10459250, 10459299, 10459113, 10459127, 10459130, 10487568, 10487571, 1117863, and 1117850.

Figure 3:
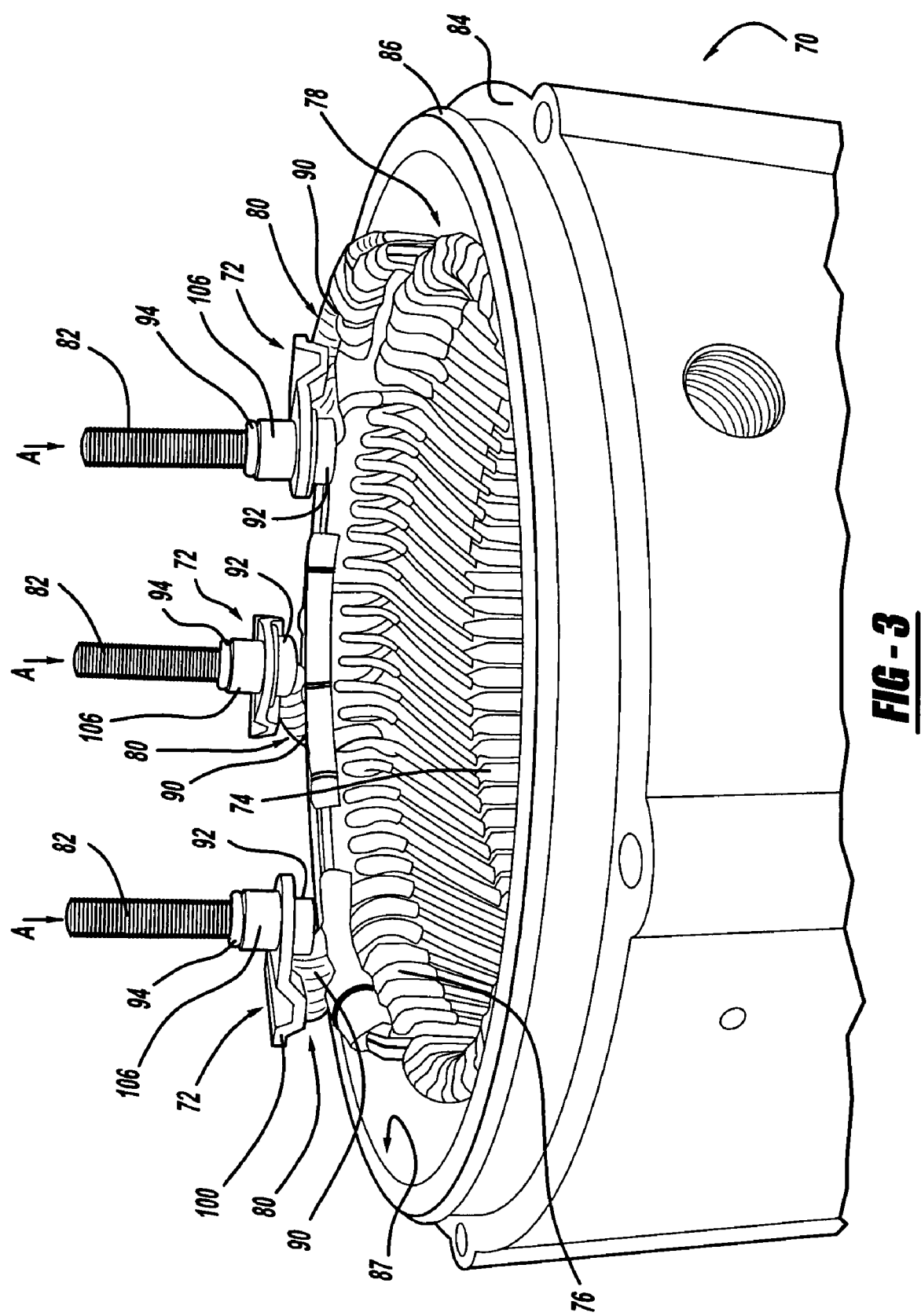
FIG. 3 is a side view of the oil-cooled 50 DN stator assembly with the improved stator terminal insulators installed on the three phase lead terminals of the stator assembly in accordance with the teachings of the present invention.

FIG. 3 is a side view of an oil-cooled 50 DN stator assembly 70 with three improved stator terminal insulators 72 installed in accordance with the teachings of the present invention. As will be apparent to one skilled in the art, the stator assembly 70 is configured and dimensioned for use in conjunction with a rectifier assembly, a stationary field winding assembly, a drive end assembly, and a rotating rotor in order to form a functional oil-cooled 50 DN alternator that is cooled by a continuous flow of engine oil. The original equipment manufacturer (OEM) for oil-cooled 50 DN alternators is Remy, Incorporated.

The stator assembly 70 includes a steel lamination 74 with silver soldered hair-pins 76 that form a three phase stator winding assembly 78. The copper hair-pins 76 can also be resistance or induction welded. The hair-pins 76 are preferably formed from copper magnet wire and are dipped in a tin-lead solder after welding. The three phase winding assembly 78 includes three phase leads 80. The leads 80 are of a flexible lead design formed from flexible stranded wire that is electrically connected to the hair-pins 76. The leads 80 are preferably made from stranded #6 AWG wire. The three phase leads 80 are connected to threaded stator terminals 82. The terminals 82 are preferably made from a brass material but can be made from other conductive materials such as steel. The leads 80 carry the electrical current from the hair-pins 76 to the terminals 82. The terminals 82 in turn carry the electrical current to a rectifier comprising six diodes (not shown) that are assembled in a rectifier housing assembly. The steel lamination 74 and the hair-pins 76 of the three phase winding assembly 78 are enclosed by a stator case 84 that is preferably made of aluminum. The lamination 74 is positioned within the stator case 84 by three locking bolts 85, one of which is visible in FIGS. 8 and 11, which are installed through the case 84 and into the lamination 74. The three lead terminals 82 extend a predetermined distance above a top lip portion 86 of the stator case 84. As shown in FIG. 3, the leads 80 are formed from predetermined lengths of the stranded wire such that the terminals 82 are supported in an upright direction and are positioned substantially parallel to an inner diameter 87 of the case 84. The leads 80 are covered with a flexible insulating sleeving material 90 to prevent electrical shorting or grounding with the stator case 84 or other 50 DN alternator components. As will be discussed in detail below with reference to FIGS. 6-8 and 11, the flexible leads 80 provide for independent movements of the three terminals 82 such that they are easily positioned for insertion through three openings in a rectifier end frame housing during assembly of the stator assembly 70. Unlike the prior art improvement that incorporates the problem prone rigid one-piece insulator 60 to fix and support the leads 48, the present invention retains the flexibility and mobility of the leads 80 by minimizing the lengths of the #6 AWG wire such that the leads 80 have enough support to maintain the relative positions of the terminals 82 during the assembly process.

Figure 6:
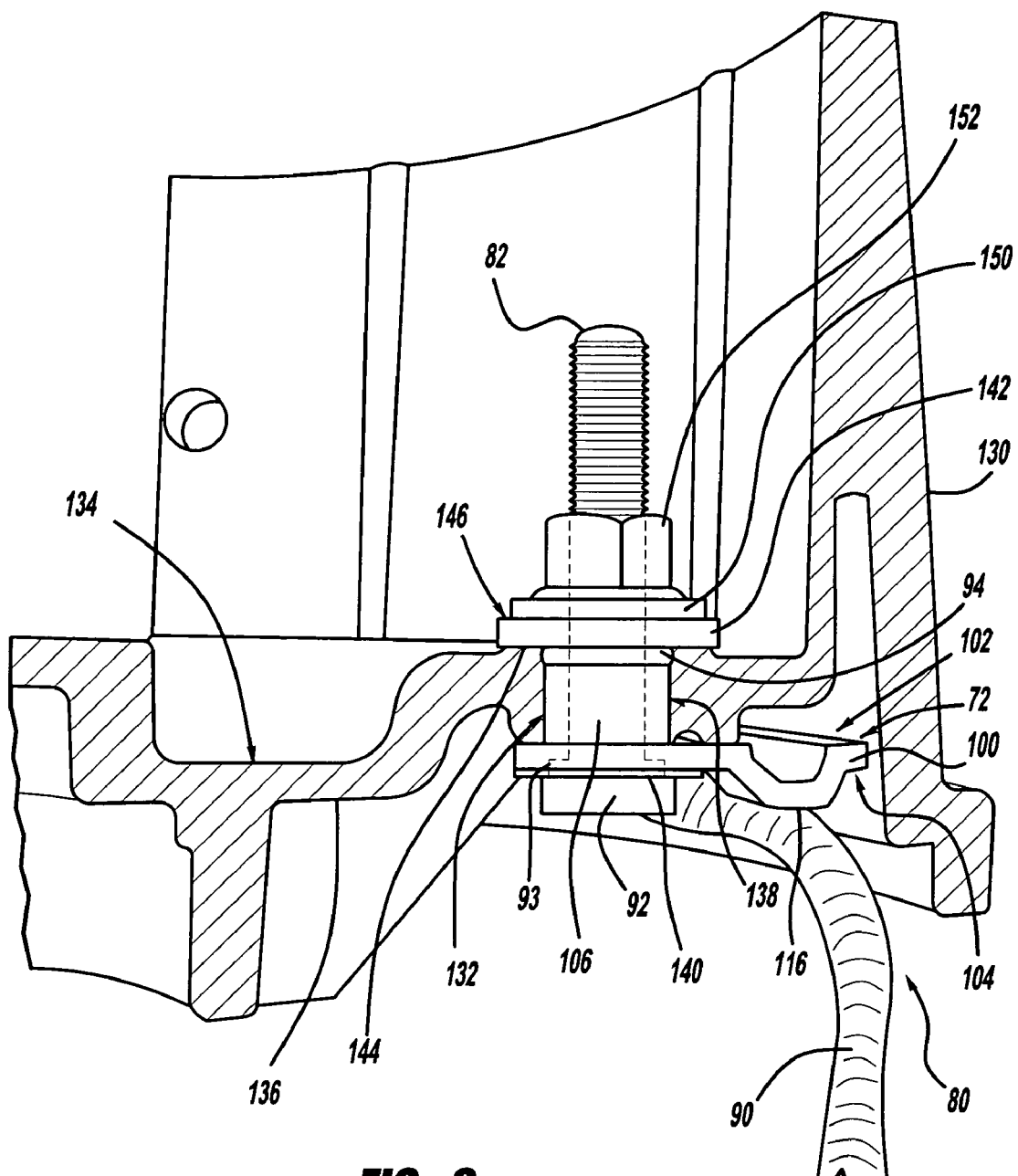
FIG. 6 is a partial cross sectional side view of the improved stator terminal insulator installed in a rectifier end frame housing along line 6-6 of FIG. 7 in accordance with the present invention.

The insulators 72 are installed over the terminals 82 in conjunction with terminal head portions 92 that include raised square shoulder portions 93, shown in FIG. 6. O-rings 94 are installed on each of the terminals 82. The o-rings 94 are preferably made from silicone but can be made from vition or other commonly available o-ring materials. The o-rings 94 provide a friction fit with the terminals 82 for holding the insulators 72 in position about each of the terminals 82. As such, the present invention provides an improvement over the prior art stator assembly 40 that ties the rigid one-piece insulator 60 to the leads 48 because the o-rings 94 are readily removable from the terminals 82 thereby allowing removal of any and/or all of the insulators 72 from the terminals 82. As will be discussed below, the combination of the insulators 72 and the o-rings 94 are also an improvement over the prior art planar insulators 24 in that the insulators 72 provide thicker terminal insulation and dual application capabilities. Because the leads 80 are flexible, each of the terminals 82 with its associated installed insulator 72 is independently moveable with respect to the other terminals 82 and their installed insulators 72. This independent mobility of each of the terminals 82 prevents an individual insulator 72 from being subjected to forces applied to one or more of the terminals 82 that the individual insulator 72 is not installed upon. As such, the insulators 72 are not prone to cracking as with the prior art rigid one-piece insulator 60 during and/or after assembly with a rectifier housing. Furthermore, the ability of the terminals 82 and associated individual insulators 72 to move in individual and differing directions facilitates non-uniform assembly processes with a rectifier housing in a non-damaging manner.

Figure 7:
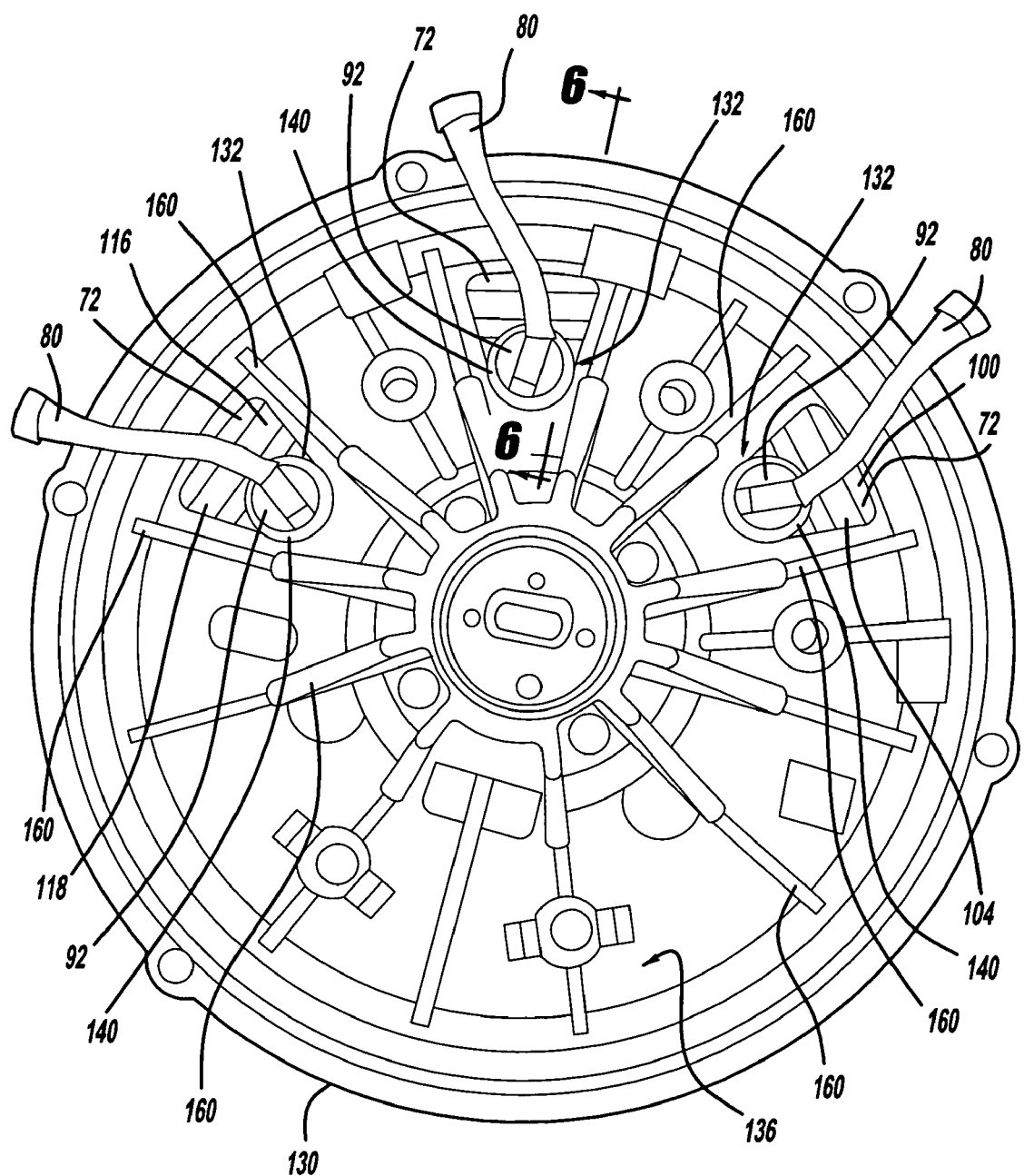
FIG. 7 is a bottom view of the rectifier end frame housing showing three of the improved stator terminal insulators installed between three stator lead terminals and an external surface of a rectifier end frame housing assembly in accordance with the present invention.

Turning to FIGS. 4 and 5, the details of the stator terminal insulator 72 are shown in accordance with the preferred embodiment of the present invention. FIG. 4 is a top perspective view of the improved stator terminal insulator 72, and FIG. 5 is a bottom view the stator terminal insulator 72. The insulator 72 includes an electrically insulating base member 100 including a top surface 102 and a bottom surface 104. In accordance with a preferred embodiment, the base member 100 is triangular in shape such that assembly with a 50 DN rectifier housing assembly is facilitated. However, one skilled in the art will realize that the outline shape of the base member 100 can be formed as other shapes that allow mating with a 50 DN rectifier housing assembly. An insulating cylindrical bushing member 106 extends from the top surface 102 of the base member 100. One skilled in the art will realize that the outer shape of the bushing member 106 can be changed without departing from the scope of the present invention. The bushing member 106 includes an aperture 108 that extends from an upper surface 110 through to the bottom surface 104 of the base member 100. The aperture 108 has a diameter dimensioned for receiving one of the terminals 82 of the stator assembly 70 in a direction from the bottom surface 104 to the upper surface 110. Preferably, the bushing member 106 is integral with the base member 100. However, the bushing member 106 can be a separate member. The upper surface 110 is dimensioned for mating with and against one of the o-rings 94. A first recess 112 and a second recess 114 each with open sides and sloped edges 115 and 117 are formed in the top surface of the base member 100 for receiving and aligning the insulator 72 within a rectifier housing. Reference is made to FIG. 7 showing the preferred alignment of the insulators 72 with a rectifier housing 130. Returning to FIGS. 4 and 5, a first protrusion 116 and a second protrusion 118 extend outward from the bottom surface 104 of the base member 100. A gap portion 120 is dimensioned such that one of the leads 80 fits between the first protrusion 116 and the second protrusion 118 without interfering with other 50 DN components. The bottom surface 104 includes a square shaped recess 122 extending into the base member 100 for acceptance of one of the raised square shoulder portions 93 of one of the terminals 82. Specifically, the recess 122 includes four edges 124 that correspond to the shape of the shoulder portion 93 such that the insulator 72 does not rotate independently about a longitudinal axis A of the terminal 82 that the insulator 72 is installed upon. The insulator 72 is preferably made from polyphenylene sulfide, but other electrically insulating materials that can withstand heat, vibration, and engine oil may be used.

Figure 8:
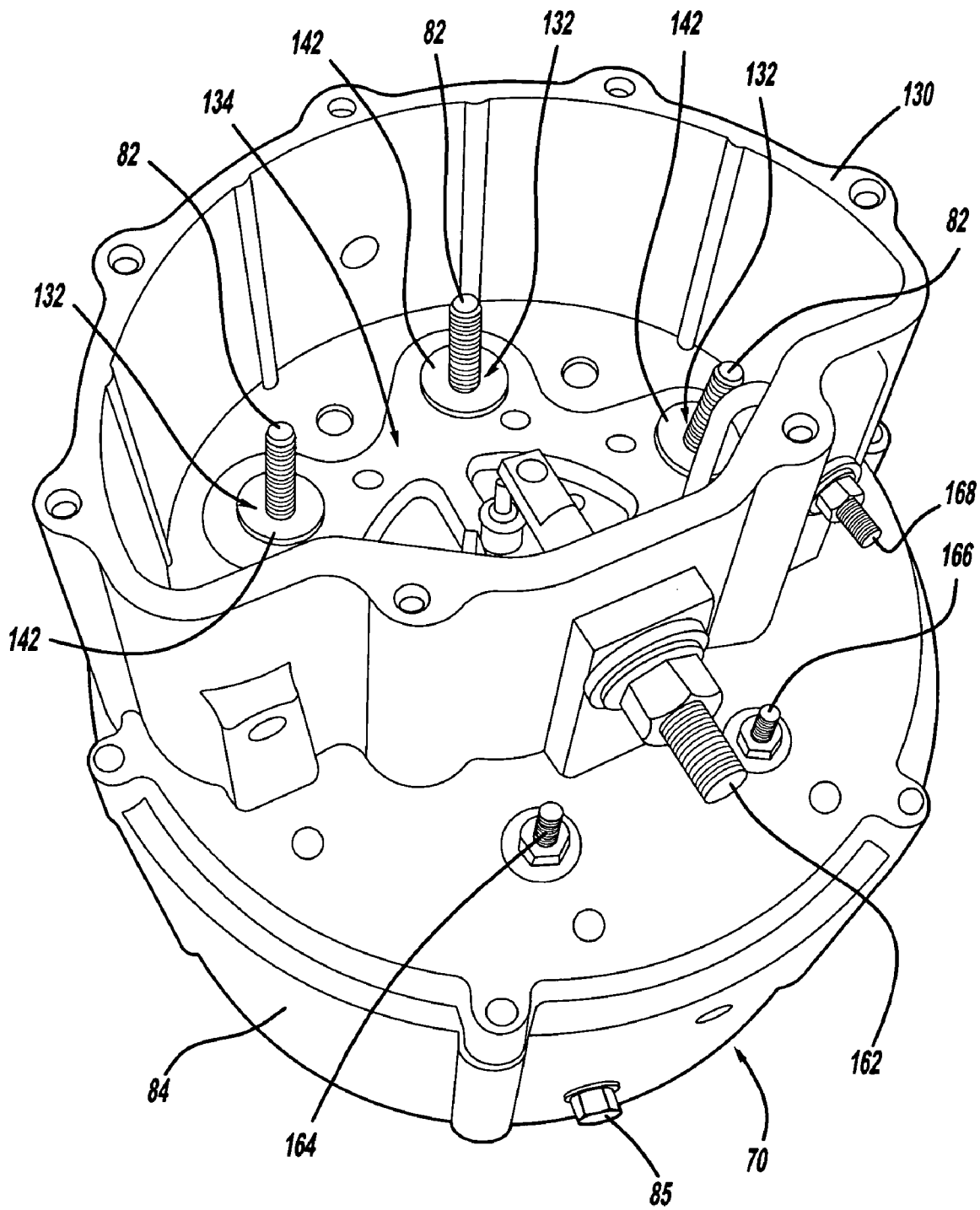
FIG. 8 is a perspective view of the rectifier end frame housing assembly coupled to the stator assembly with the stator terminals extending through openings that have been enlarged to a second diameter in accordance with the present invention.

Referring to FIG. 6-8, the stator assembly 70 and the insulator 72 are shown installed in conjunction with an oil-cooled 50 DN rectifier housing 130, Delco Remy part number 10471611, that has been modified for use with the insulator 72 in accordance with the present invention. The rectifier housing 130 includes three openings 132 that extend from an internal surface 134 to an external surface 136. In accordance with a preferred embodiment, the three openings 132 have been drilled out from an original first diameter of approximately 0.524" to 0.534" to an enlarged second diameter of approximately 0.609" to 0.612" in order to accept a corresponding outer diameter 138 of the insulating bushing 106 that is maximized with respect to the enlarged size of the opening 132. A will be apparent to one skilled in the art, the dimensions of the openings 132 can be changed to accept an insulating bushing 106 with a different sized outer diameter 138 without departing from the scope of the present invention. Additionally, the rectifier housing 130 can be originally manufactured with openings 132 corresponding to the enlarged second diameter.

Figure 9:
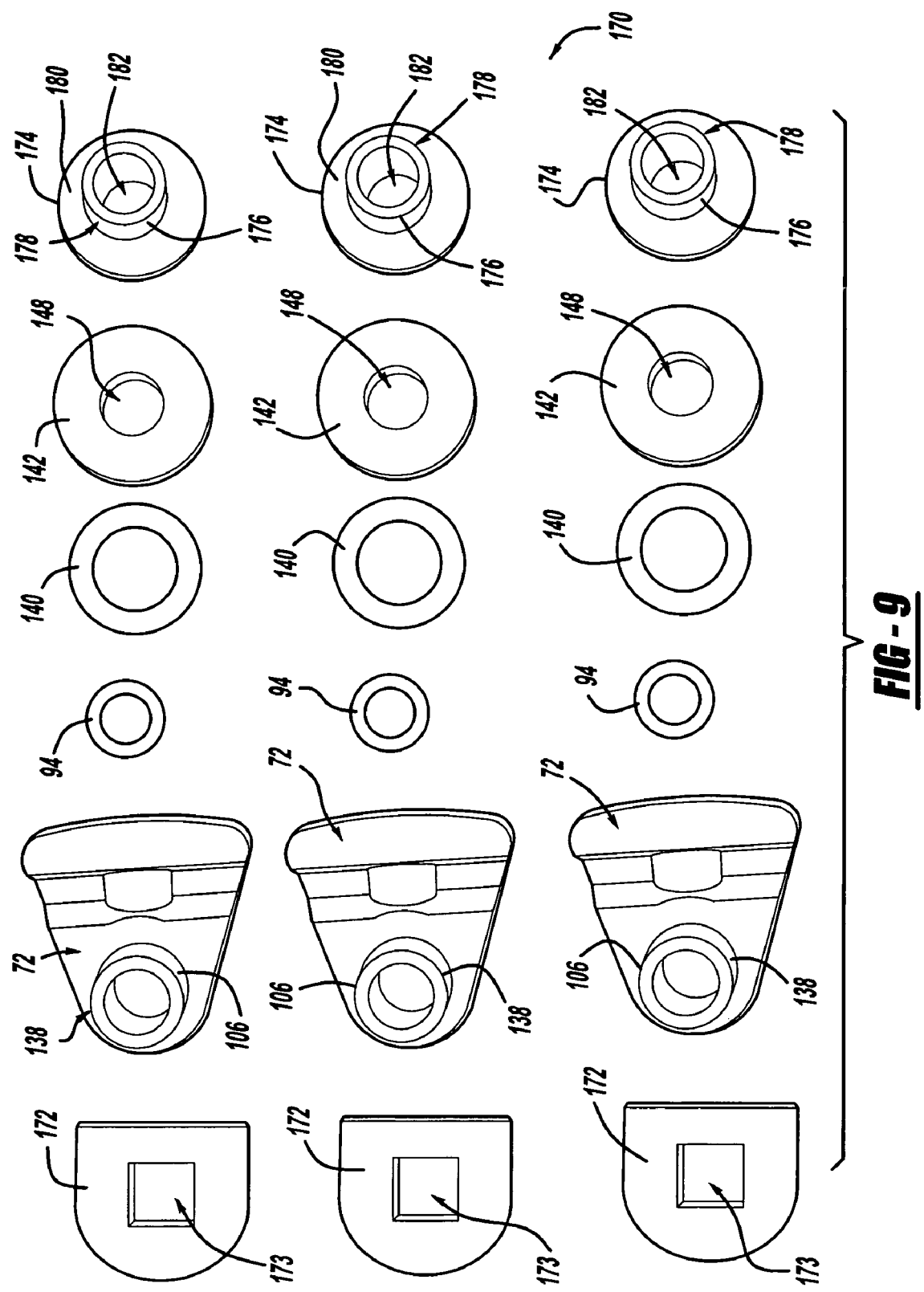
FIG. 9 is a top perspective view of a dual application oil-cooled 50 DN part kit accordance with the present invention.

FIG. 6 is a partial cross sectional side view showing one of the improved stator terminal insulators 72 installed in one of the openings 132 along line 6-6 of FIG. 7. As shown, the lead 80 is attached to the terminal head portion 92 of the terminal 82, and the terminal 82 extends through the base member 100, the insulating bushing 106, and the o-ring 94. The shoulder portion 93 of the terminal 82 is disposed within the square shaped recess 122 in the bottom surface 104. The lead 80 is positioned between the first protrusion 116 and the second protrusion 118. In accordance with one embodiment of the present invention, a brass flat washer 140 is disposed between the head portion 92 and the bottom surface 104 of the base member 100 in order to provide additional support to the base member 100. The base member 100 is disposed between the head portion 92 of the terminal 82 and the external surface 136 of the housing 130. The first recess 112 and the second recess 114 help guide the insulator 72 into position against the external surface during assembly of the stator assembly 70 and the rectifier housing 130. The insulating bushing 106 extends from the top surface 102 of the base member 100 up into the opening 132. The o-ring 94 is disposed about the terminal 82 and against the upper surface 110 of the bushing 106. The insulator 72 electrically insulates the terminal 82 from the rectifier housing 130. Insulating flat washers 142 including a first flat surface 144, a second flat surface 146 and an aperture 148, also shown in FIG. 9, are configured for assembly about the terminals 82. The first flat surface 144 contacts the internal surface 134 of the housing 130. Steel flat washers 150 are disposed on the second flat surfaces 146 of the insulating flat washers 142. Locking nuts 152 are threaded and secured onto each of the terminals 82 in order to secure the insulators 72 and the o-rings 94 within the openings 132. The insulating flat washers 142 electrically insulate the steel washers 142 and the nuts 152 from the housing 130. As such, after installation, the leads 80 in conjunction with the terminals 82 carry electrical currents from the winding assembly 78 to a rectifier within the housing 130 (not shown) without shorting or grounding to the housing 130.

FIG. 7 is a bottom view of the rectifier housing 130, with the stator winding assembly 78 and case 84 removed, showing the three leads 80 and the improved stator terminal insulators 72 installed within the openings 132. As shown, the leads 80 are attached to the terminal head portions 92 of the terminals 82. The brass flat washers 140 are disposed between the head portions 92 and the bottom surfaces 104 of the base members 100. The base members 100 are disposed between the head portions 92 of the terminals 82 and the external surface 136 of the housing 130. The leads 80 are positioned between the first protrusions 116 and the second protrusions 118 without interfering with partition support members 160 extending in an outward direction from the external surface 136 during assembly of the housing 130 and the stator assembly 70. As will be apparent to one skilled in the art, the ability of the insulators 72 to move independently of one another facilitates the insertion of the terminals 82 and the insulating bushing 106 into the openings 132 during the assembly process. Also, the triangular shape of the base members 100 in conjunction with the first recesses 112 and the second recesses 114 guide the insulators 72 and the terminals 82 into the assembled positions between the partition members 160.

FIG. 8 shows a perspective view of the rectifier end frame housing 130 coupled to the stator assembly 70 with the stator terminals 82 extending through the enlarged holes 132 in accordance with the present invention. The insulating washers 142 are shown installed on the terminals 82 and against the internal surface 134 of the rectifier housing 130. As will be apparent to one skilled in the art, the rectifier housing also includes a battery terminal post 162, a first field terminal 164, a second field terminal 166, and a relay terminal 168 that are installed and insulated from the housing 130.

Figure 1:
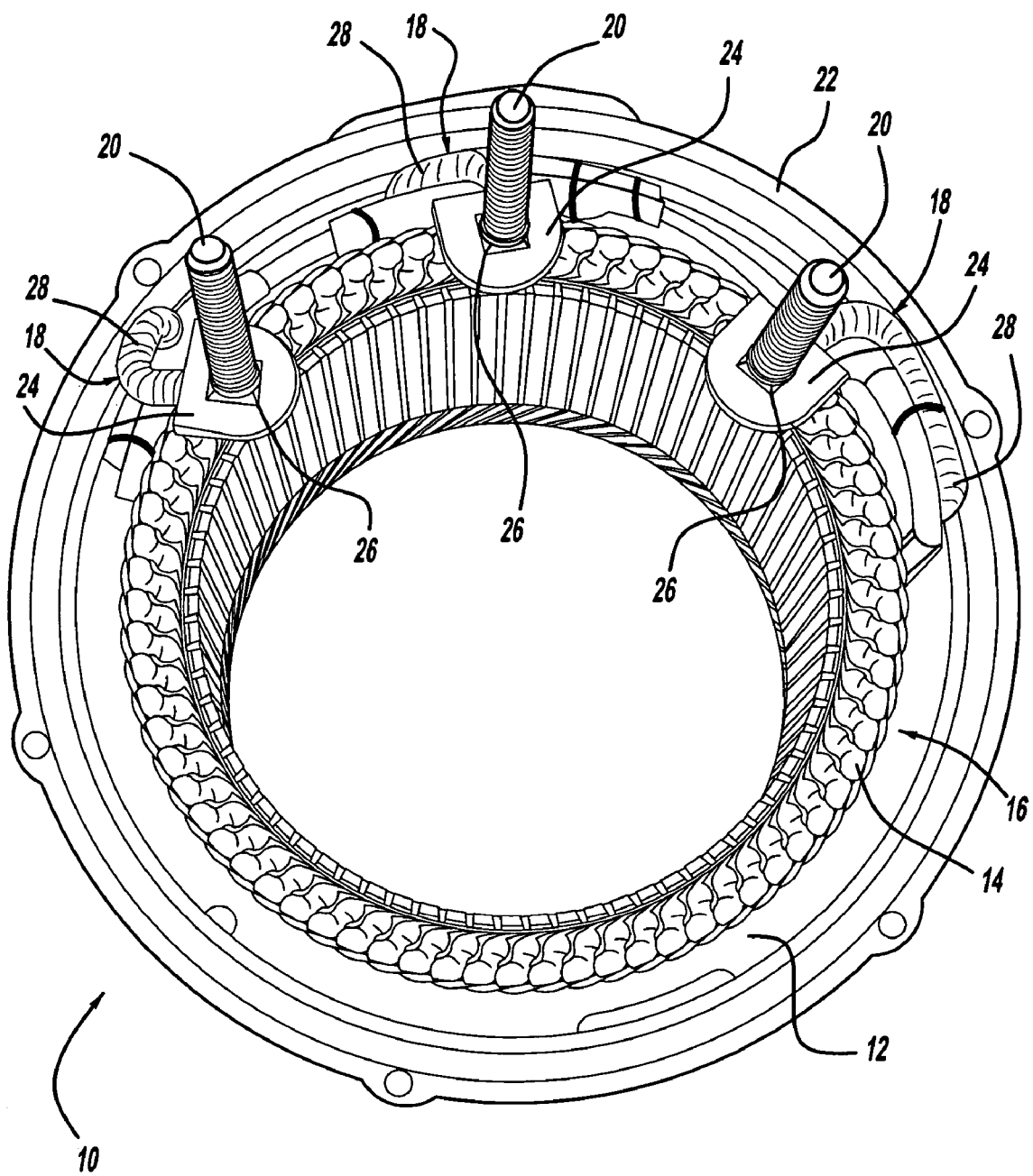
FIG. 1 is a top view of a prior art oil-cooled 50 DN stator with three original planar insulators installed on three phase lead terminals of the stator.
Figure 2:
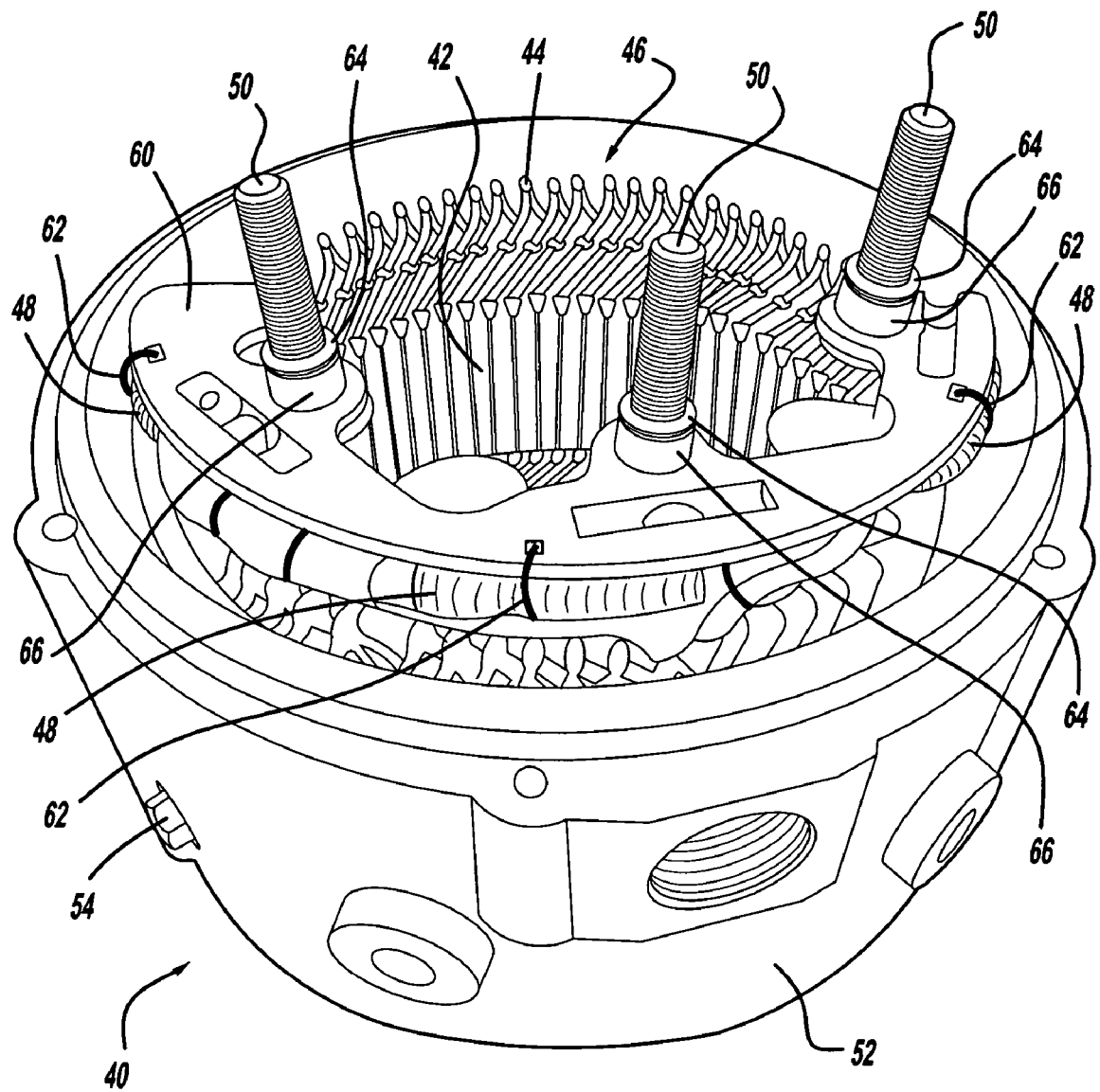
FIG. 2 is a perspective view of a prior art oil-cooled 50 DN stator with a rigid one-piece stator lead and terminal insulator fixed to three phase terminals and leads of the stator.

Turning to FIG. 9, a top perspective view of a dual application oil-cooled 50 DN part kit 170 in accordance with a preferred embodiment of the present invention is shown. The parts kit 170 includes three of the improved stator terminal insulators 72, three of the o-rings 94, three of the brass flat washers 140, and three of the insulating flat washers 142. The parts kit 170 further includes three planar insulators 172, having the same configuration as the prior art insulators 24 shown in FIG. 1, and three top hat shaped insulators 174, having the same configuration as Delco Remy part number 1952212 insulators. The planar insulators 172 include square apertures 173 dimensioned for receiving the raised square shoulder portions 93 of the terminals 82. The top hat insulators 174 include cylindrical portions 176 with outer diameters 178 that are less than the outer diameters 138 of the insulating bushing 106. The top hat insulators 174 also have flared round top sections 180 and apertures 182 dimensioned for receiving the terminals 82. The parts kit 170 can further include, but is not limited to, a container member such as a container member 184, shown in FIG. 10. When the container member 184 is included, the three improved stator terminal insulators 72, the three o-rings 94, the three brass flat washers 140, the three insulating flat washers 142, the three planar insulators 172, and the three top hat insulators 174 are disposed within the container member 184 for ease of identification, storage, shipment and use. By way of example, the parts kit 170 can also be disposed in a bag type apparatus.

The parts kit 170 has dual applications because it is adapted for use in insulating the three terminals 82 of the stator assembly 70 from the rectifier housing 130 having the multiple openings 132 that have been increased from the original first diameter to the second larger diameter. Additionally, with reference to FIG. 11, the parts kit 170 is also adapted for insulating the three terminals 82 of the stator assembly 70 from a rectifier housing 210 with original first diameter openings 212 that have diameters smaller than the drilled out openings 132. The openings 212 are dimensioned for receiving the cylindrical portions 176 of the top hat insulators 174 but not the thicker and wider insulating bushings 106 of the insulators 72. The parts kit 170 can be used for the assembly of a new oil-cooled 50 DN alternator or for the remanufacturing of a failed oil-cooled 50 DN alternator having an unmodified rectifier housing 210 or a modified rectifier housing 130.

In order to use the parts kit 170 to assemble the stator assembly 70 to the modified rectifier housing 130 or the unmodified rectifier housing 210, an individual simply opens the container 184, if utilized, for access to the required components. When the parts kit 170 is used to insulate the terminals 82 from the modified rectifier housing 130, the individual first installs the brass flat washers 140 and then the improved insulators 72 on the terminals 82. Next, as shown in FIGS. 3 and 6, the o-rings 94 are installed on the terminals 82 against the upper surfaces 110 such that a friction fit holds the insulators 72 in place. Next, the housing 130 is placed over the stator assembly 70 with the terminals 82 extending through the openings 132 with the insulators 72 and the o-rings 94 insulating the terminals 82 from the housing 130. During installation of the housing 130, the use of the insulators 72 allows for independent movements of the terminals 82 in different directions, and the first recess 112 and the second recess 114 guide the terminals 82 and the base member 100 into position. This allows for different installation techniques to be utilized that may require such independent movements and guidance of the terminals 82 without damaging the insulators 72. Lastly, as shown in FIG. 8, the insulating flat washers 142 are installed on the terminals 82 and against the internal surface 134 of the housing 130. The planar insulators 172 and the top hat insulators 174 are not required for use with the housing 130. As such, the planar insulators 172 and the top hat insulators 174 can be discarded or saved for use in other 50 DN alternator applications.

Figure 11:
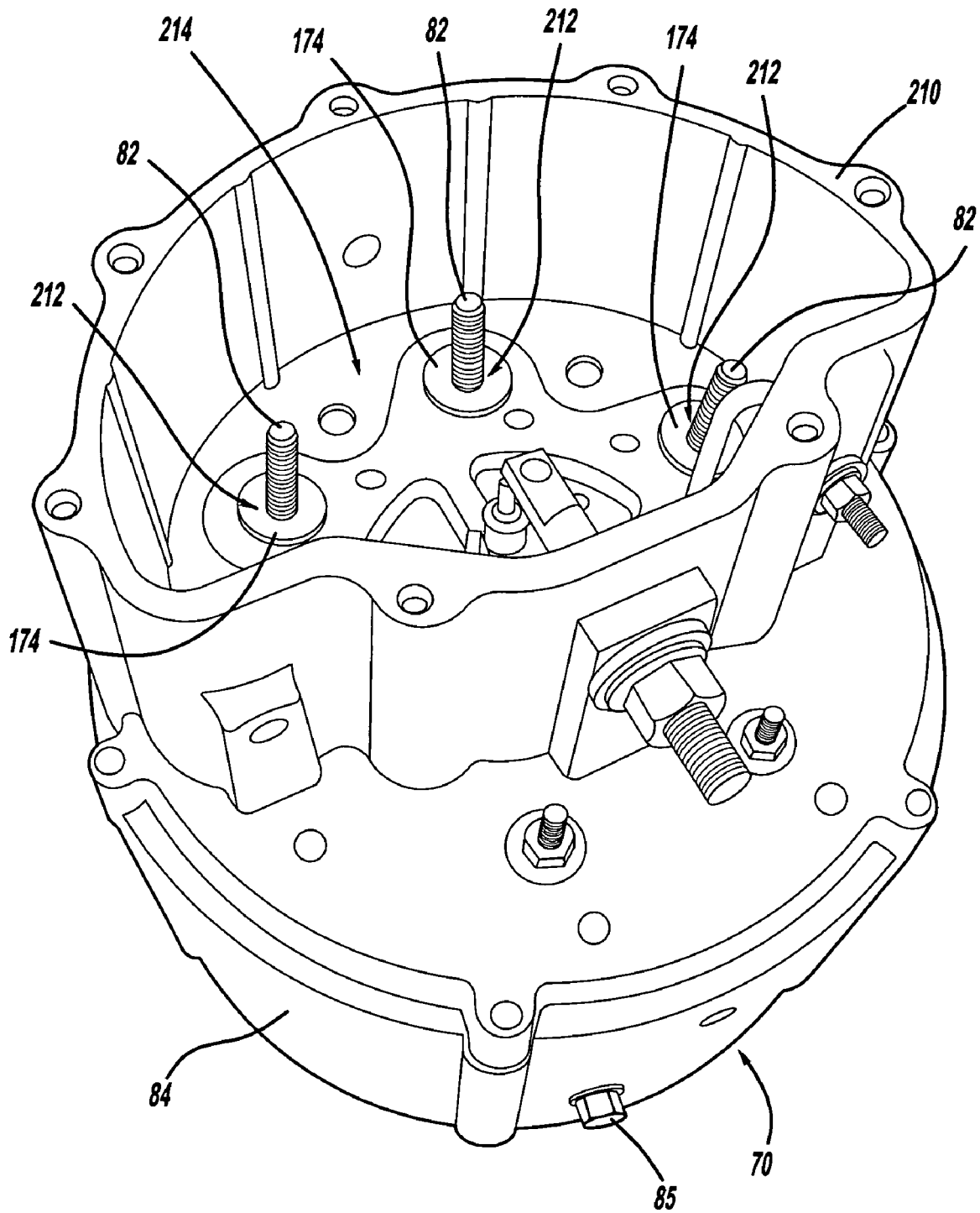
FIG. 11 is a perspective view of an original rectifier end frame housing assembly coupled to the stator assembly with the stator terminals extending through original openings each with an original first diameter in accordance with the present invention.

When the parts kit 170 is used to insulate the terminals 82 from the unmodified rectifier housing 210, the individual first installs the planar insulators 172 on the terminals 82 about the shoulder portions 93. Next, the housing 210 is placed over the stator assembly 70 with the terminals 82 extending through the openings 212. The planar insulators 172 are disposed between and insulate the terminal head portions 92 of the terminals 82 from the housing 210. Lastly, as shown in FIG. 11, the top hat insulators 174 are installed in the housing 210 onto the terminals 82. The cylindrical portions 176 of the top hat insulators 174 extend into the openings 212, and the flared top round sections 180 contact an internal surface 214 of the housing 210 in order to completely insulate of the terminals 82. At this point, the three flat insulating washers 142, the three o-rings 94, the three insulators 72, and the three brass flat washers 140 are not required for assembly of the stator assembly 70 and the rectifier housing 210. As such, the extra components may discarded or saved for use with another 50 DN alternator application.

Figure 10:
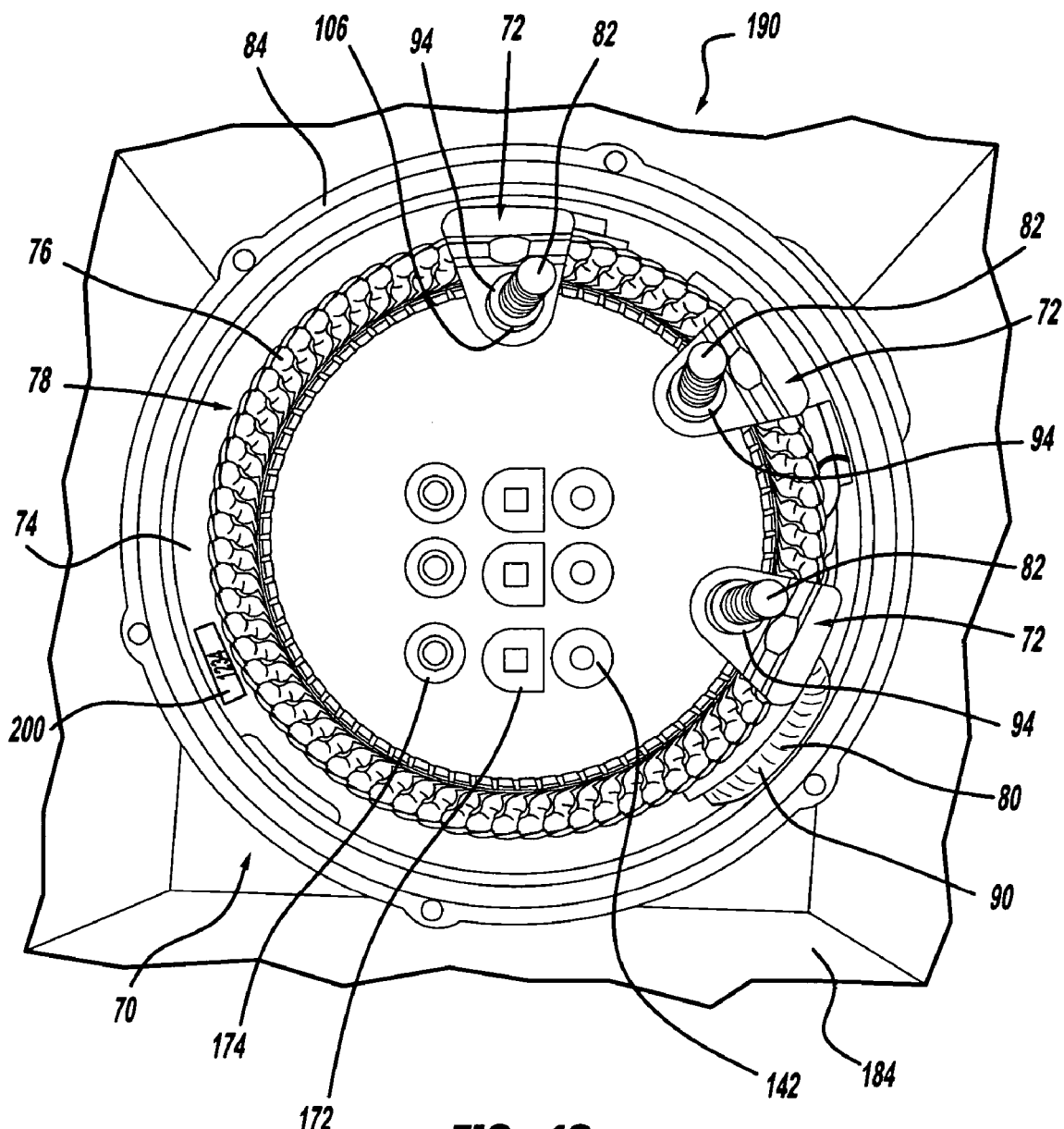
FIG. 10 is a top perspective view of a dual application oil-cooled 50 DN parts kit including the improved stator terminal insulators preinstalled on the stator assembly in accordance with the present invention.

FIG. 10 is a top perspective view of a dual application oil-cooled 50 DN parts kit 190 in accordance with another embodiment of the present invention. The part kit 190 includes the stator assembly 70 with the three brass flat washers 140, the three improved stator terminal insulators 72, and the three o-rings 94 preinstalled on the three terminals 82. The stator assembly 70 is disposed within the container member 184. The parts kit 190 further includes the three flat insulating washers 142, the three planar insulators 172, and the three top hat shaped insulators 174 that are also disposed within the container member 184. The stator assembly 70 further includes a unique serial number label 200 that identifies the stator assembly 70 and the parts kit 190 for tracking purposes. Preferably, the serial number label 200 is positioned in a visible area of the lamination 74 for viewing upon opening of the container member 184. Additionally, it is preferable to install the label on the lamination 74 prior to application of a baking varnish to the stator winding assembly 78 such that the label becomes a permanent fixture of the lamination 74.

As with the parts kit 170 of FIG. 9, the parts kit 190 has dual applications for insulating the three terminals 82 of the stator assembly 70 from the modified rectifier housing 130 and the unmodified rectifier housing 210. As with parts kit 170, the parts kit 190 is adapted for use in assembling or remanufacturing a 50 DN alternator.

In order to use the parts kit 190, an individual simply opens the container 184 and removes the stator assembly 70 and notes or records the serial number listed on the label 200 for reference purposes. As discussed in conjunction with FIGS. 6-8, the stator assembly 70 is configured for assembly with the rectifier housing 130 having the multiple openings 132 that have been increased from the original first diameter to the second larger diameter. Next, the housing 130 is installed over the preinstalled insulators 72 and the o-rings 94 with the terminals 82 extending through the openings 132 in the rectifier housing 130. As discussed above, the insulators 72 insulate the terminals 82 from the housing 130. Next, as discussed with reference to FIG. 8, the three flat insulating washers 142 are installed over the terminals 82. At this point, the planar insulators 172 and the top hat insulators 174 are not required for assembly of the stator assembly 70 and may be discarded saved or reused with another 50 DN alternator application.

Alternatively, the parts kit 190 is also configured for insulating the three terminals 82 of the stator assembly 70 from the unmodified rectifier housing 210 with the original first diameter openings 212. This is accomplished by simply removing the three preinstalled o-rings 94, the three preinstalled insulators 72, and the three preinstalled brass flat washers 140 from the terminals 82 for discard or other use. Next, the planar insulators 172 are installed on the terminals 82 and the housing 210 is installed over the terminals 82. The planar insulators 172 are disposed between the terminal head portions 92 of the terminals 82 and an external surface of the housing 210. The top hat insulators 174 are then installed over the terminals 82, in place of the insulating flat washers 142, with the cylindrical portions 176 extending into the original sized openings 212 and the flared top round sections contacting the internal surface 214 of the rectifier housing 210. At this point, the three flat insulating washers 142, the three o-rings 94, the three insulators 72, and the three brass flat washers 140 are not required for assembly of the stator assembly 70 and the rectifier housing 210 and may discarded or reused.

One skilled in the art will realize that the contents of the part kits 170 and 190 can be increased or decreased without departing from the scope of the present invention. For example, additional items include, but are not limited to, screws for attaching the rectifier housing 130 or the rectifier housing 210 to the stator case 84, additional o-rings and insulators, an oil seal, an oil line, diodes, bearings, and a test sheet listing results from a hi-pot test of the stator assembly 70.

From the foregoing, it can be seen that the stator assembly 70 with the improved stator terminal insulators 72 of the present invention has the same thicker insulation properties as the rigid one-piece insulator 60, i.e. properties of the insulating bushing 106, without the associated problems of rigidly and lack of independent lead and terminal movements. Furthermore, the improved stator terminal insulators 72 of the present invention provide for and allow independent movements of the individual stator leads 80 and the terminals 82. As such, the cracking problems associated with the rigid one-piece insulator 60 is prevented when utilizing the improved stator terminal insulators 72 during the assembly or remanufacturing process of an oil-cooled 50 DN alternator.

An additional advantage of the present invention is that the improved parts kit 170 and the parts kit 190 can be used to assemble the stator assembly 70 to the unmodified rectifier housing 210 or the modified rectifier housing 130 with enlarged openings. As such, an individual only needs to utilize a single parts kit during the remanufacturing of an original or a modified 50 DN alternator rectifier housing. This ability provides an advantage over prior art parts kits because an individual may not know whether the rectifier of a failed 50 DN alternator has original sized or enlarged openings until the failed 50 DN alternator is dissembled. The dual application parts kits are very useful when an individual is remanufacturing 50 DN alternator cores to original specifications.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. An insulator for use with a stator having a plurality of leads and a plurality of terminals, the insulator comprising:
   a base member including a top surface and a bottom surface, wherein the base member is coupled to a flexible lead; and
   an insulating bushing extending from the top surface, the insulating bushing including an aperture for receiving one of the terminals, whereby the insulator and the terminal are independently movable with respect to the other terminals of the stator as a result of the flexible lead being coupled to the insulator.

2. The insulator of claim 1, further comprising:
   at least one o-ring configured for receiving the terminal and for mating with an upper surface of the insulating bushing such that the insulator is secured on the terminal, whereby the o-ring and the insulator are removable from the terminal.

3. The insulator of claim 1, further comprising:
   a first protrusion and a second protrusion extending from the bottom surface, the first protrusion and the second protrusion configured for acceptance of one of the plurality of leads there between.

4. The insulator of claim 1, wherein the bottom surface of the base member includes a recess dimensioned for acceptance of a shoulder portion of the terminal, whereby an edge of the recess secures the insulator about the shoulder portion of terminal.

5. The insulator of claim 1, wherein the insulating bushing is integral with the top surface of the base member.

6. A parts kit for use with a stator having a plurality of leads and a plurality of terminals and a rectifier housing having a plurality of openings extending from an internal surface to an external surface, the kit comprising:
at least one insulator including:
a base member comprising a top surface and a bottom surface,
wherein the base member is coupled to a flexible lead; and
an insulating bushing extending from the top surface, the insulating bushing including an aperture for receiving one of the plurality of the terminals, whereby the insulator and the terminal are independently movable with respect to the remaining terminals of the stator as a result of the flexible lead being coupled to the insulator.

7. The parts kit of claim 6, wherein the base member is dimensioned for installation between the terminal and the external surface of the rectifier housing and the insulating bushing is cylindrical and includes a first outer diameter, and wherein the insulating bushing is dimensioned for installation within one of the plurality of the holes in the rectifier housing.

8. The parts kit of claim 6, further comprising:
at least one insulating flat washer, the flat washer including:
a first flat surface;
a second flat surface; and
an aperture for receiving the terminal, wherein the first flat surface is dimensioned for installation against the internal surface of the rectifier housing.

9. The parts kit of claim 6, further comprising:
at least one o-ring configured for receiving the terminal and for installation against an upper surface of the insulating bushing such that the insulator is secured on the terminal, whereby the o-ring and the insulator are removable from the terminal.

10. The parts kit of claim 6, wherein the insulator further comprises:
a first protrusion and a second protrusion extending from the bottom surface, the first protrusion and the second protrusion configured for acceptance of one of the plurality of leads there between, wherein the bottom surface of the base member includes a recess dimensioned for acceptance of a shoulder portion of the terminal, whereby an edge of the recess secures the insulator about the shoulder portion of terminal such that the insulator and the terminal are coupled together.

11. The parts kit of claim 6, further comprising:
at least one planar insulator comprising a hole for receiving one of the plurality of terminals, wherein the planar insulator is dimensioned for installation between the terminal and the external surface of the rectifier housing.

12. The parts kit of claim 11, further comprising:
at least one hat shaped insulator comprising an aperture for receiving the terminal, wherein the hat shaped insulator includes a second outer diameter that is less than the first outer diameter of the insulating bushing and is dimensioned for installation against the internal surface of the rectifier housing.

13. The parts kit of claim 6, further comprising:
at least one container member, wherein the at least one insulator is disposed within the at least one container member.

14. An alternator pads kit for use in the assembly of a rectifier housing having a plurality of openings extending from an internal surface to an external surface, the kit comprising:
a stator comprising a plurality of leads and a plurality of terminals; and
at least one insulator, the insulator including:
a base member comprising a top surface and a bottom surface, wherein the base member is coupled to a flexible lead; and
an insulating bushing extending from the top surface, the insulating bushing including an aperture for receiving one of the plurality of the terminals, whereby the insulator and the terminal are independently movable with respect to the remaining terminals of the stator as a result of the flexible lead being coupled to the insulator.

15. The alternator parts kit of claim 14, further comprising:
at least one container member, wherein the stator and the insulator are disposed within the container member.

16. The alternator parts kit of claim 14, wherein the insulator is installed on the terminal.

17. The alternator parts kit of claim 16, further comprising:
at least one o-ring installed around the terminal and against an upper surface of the insulating bushing such that the insulator is secured on the terminal, whereby the o-ring and the insulator are removable from the terminal.

18. The alternator parts kit of claim 16, the kit further comprising:
at least one planar insulator including a hole for receiving one of the plurality of terminals, wherein the insulator is removable from the terminal and the planar insulator is dimensioned for installation between the terminal and the external surface of the rectifier housing.

19. The alternator parts kit of claim 18, the kit further comprising:
at least one hat shaped insulator comprising an aperture for receiving the terminal, wherein the hat shaped insulator is dimensioned for installation against the internal surface of the rectifier housing.

20. The alternator parts kit of claim 14, further comprising:
at least one insulating flat washer, the flat washer including:
a first flat surface;
a second flat surface; and
an aperture for receiving the terminal, wherein the first flat surface is dimensioned for installation against the internal surface of the rectifier housing.

21. An alternator stator comprising:
a plurality of leads;
a plurality of terminals coupled to the plurality of leads;
at least one insulator, the insulator including:
a base member comprising a top surface and a bottom surfaces, wherein the base member is coupled to a flexible lead; and
an insulating bushing extending from the top surface, the insulating bushing including an aperture for receiving one of the plurality of terminals, whereby the terminal extends through the aperture and whereby the insulator and the terminal are independently movable with respect to the remaining plurality of leads and terminals of the stator as a result of the flexible lead being coupled to the insulator.

22. The alternator stator of claim 21, wherein the insulating bushing is integral with the top surface of the base member and the insulator is removable from the terminal.

23. The alternator stator of claim 21, further comprising:
at least one o-ring installed around the terminal and against an upper surface of the insulating bushing such that the insulator is secured about the terminal, whereby the o-ring and the insulator are removable from the terminal.

24. A 50 DN alternator comprising:
(a) a stator including;
  (1) a plurality of leads;
  (2) a plurality of terminals attached to the plurality of leads;
  (3) at least one insulator installed on one of the plurality of terminals, the insulator including:
    (i) a base member comprising a top surface and a bottom surface; and
    (ii) an insulating bushing extending from the top surface, the insulating bushing including an aperture for receiving one of the plurality of the terminals, whereby the terminal extends through the insulator and whereby the insulator and the terminal are independently movable with respect to the remaining terminals of the stator;
(b) a rectifier housing having a plurality of openings extending from an internal surface to an external surface, whereby the stator is coupled to the rectifier housing with the terminal extending through one of the plurality of openings in the rectifier housing and with the insulator disposed between the terminal and the external surface of the rectifier housing such that the insulating bushing is disposed within the opening, whereby the insulator insulates the terminal from the rectifier housing.

25. The 50 DN alternator of claim 24, further comprising:
at least one o-ring installed around the terminal and against an upper surface of the insulating bushing such that the insulator is secured on the terminal, whereby the o-ring and the insulator are removable from the terminal.

26. The 50 DN alternator of claim 24, further comprising:
at least one insulating flat washer, the flat washer including:
  a first flat surface;
  a second flat surface; and
  an aperture through which the terminal extends, wherein the first flat surface contacts the internal surface of the rectifier housing.

* * * * *